United States Patent [19]

Pendergast

[11] 4,360,085
[45] Nov. 23, 1982

[54] SHOCK ABSORBER WITH DEFLECTOR FOR HIGH PRESSURE REBOUND OIL

[75] Inventor: Joseph P. Pendergast, Bellbrook, Ohio

[73] Assignee: General Motors Corporation, Detroit, Mich.

[21] Appl. No.: 209,963

[22] Filed: Nov. 24, 1980

[51] Int. Cl.³ .............................................. F16F 9/36
[52] U.S. Cl. .................................. 188/315; 188/318; 188/322.17; 277/68
[58] Field of Search ............... 188/315, 317, 318, 269, 188/281, 322.14, 322.16, 322.17, 322.18, 322.19; 267/64.26, 64.15; 277/68, 69; 92/168

[56] References Cited

U.S. PATENT DOCUMENTS

| | | | |
|---|---|---|---|
| 2,643,147 | 1/1948 | Funkhouser et al. | 277/68 X |
| 3,241,842 | 3/1966 | Schweiger et al. | 277/68 X |
| 3,370,857 | 2/1968 | Roman | 277/68 X |
| 3,621,949 | 11/1971 | Watson | 188/322.17 X |
| 3,621,952 | 11/1971 | Long, Jr. | 188/322.17 |
| 3,936,057 | 2/1976 | Walter et al. | 277/68 X |

*Primary Examiner*—Douglas C. Butler
*Attorney, Agent, or Firm*—Charles R. White

[57] ABSTRACT

A shock absorber for a vehicle suspension and the like in which an oil deflector is mounted between the piston rod guide and a single lip low pressure seal to divert streams of high pressure oil from impingement on the seal to thereby prevent the escape of oil from the shock absorber on rebound stroke.

3 Claims, 4 Drawing Figures

SHOCK ABSORBER WITH DEFLECTOR FOR HIGH PRESSURE REBOUND OIL

This invention relates to shock absorbers for automotive spring suspensions and more particularly to a new and improved double-acting hydraulic shock absorber which incorporates an internal oil deflector which diverts jets of high pressure rebound oil away from the low pressure seal to prevent the escape of oil from the shock absorber.

Prior to the present invention, various sealing constructions were employed to seal the reciprocating piston rod and the internal components of a hydraulic shock absorber to prevent any substantial oil leakage. Among the constructions utilized were special elastomeric seals having multiple lips on the internal diameter of the seal and special springs to construct the seal to provide a close fluid sealing fit with respect to the piston rod as the piston reciprocates to dampen suspension spring motions. While these sealing constructions generally performed adequately, improved sealing was desired in some shock absorber constructions such as rebound cut-off shock absorbers in which there was rapid build-up of high fluid pressures during the rebound stroke of the piston. With such constructions, the expanding stroke of the piston is terminated by a quantity of oil trapped between the piston and the piston rod guide. When this occurs the piston rod seal located above the rod guide experiences forces from jets of oil of a magnitude which often causes seal deflection and resulting leakage of the oil. The present invention provides new and improved construction which effectively eliminates oil leakage through the piston rod seal especially during rebound stroke. With this invention a new and improved oil deflector is provided which shields the piston rod seal from jets of high pressure oil during rebound stroke which would diminish the service life of the seal and shock absorber and effectively deflects such oil to the shock absorber reservoir.

It is a feature, object, and advantage of this invention to provide a new and improved hydraulic shock absorber which incorporates a new and improved deflector which diverts high pressure oil from the resilient elastomer piston rod seal to prevent seal deflection thereby so that oil leakage from the shock absorber through the seal is minimized.

It is another feature, object, and advantage of this invention to provide a new and improved double-acting shock absorber for vehicle suspension in which a piston is slidably mounted within an oil-filled cylinder tube of the shock absorber and in which a yieldable elastomeric seal is disposed within the shock absorber for sealingly engaging the piston rod to prevent the escape of fluid therein and there is further provided an annular deflector disposed inboard of the seal which engages or approaches engagement with the periphery of the piston rod and which diverts high pressure oil streaming through the piston rod guide into the reservoir thereby preventing the deflection of the low pressure seal and the escape of oil from the shock absorber.

It is another feature, object, and advantage of this invention to provide a new and improved oil deflector which can be utilized with a single lip low pressure seal to prevent the escape of oil from a rebound cut off shock absorber on rebound and in which the high pressure jets of fluid transmitted through the rod guide are diverted by the deflector into the reservoir of the shock absorber as opposed deflection of the seal and leakage of such oil therethrough.

These and other features, objects, and advantages of this invention will be more apparent from the following detailed description and drawing in which.

Figure 1:
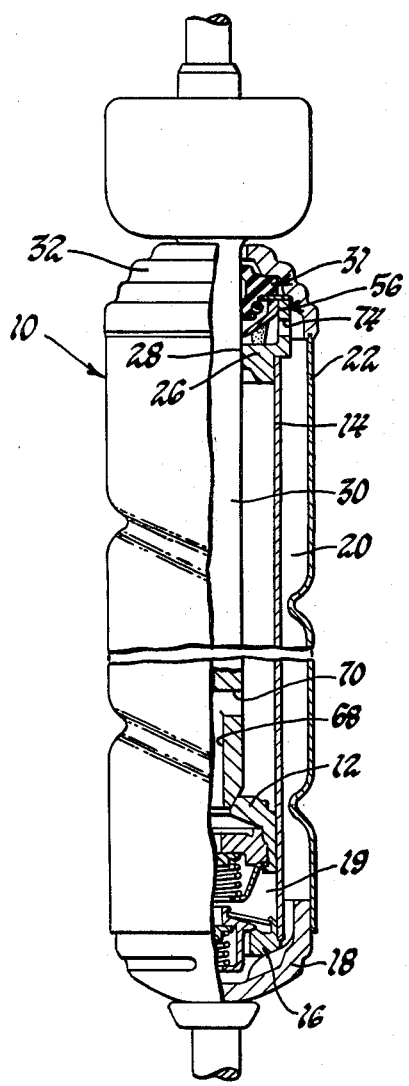
FIG. 1 is an elevational view partially in cross-section of a rebound cut-off shock absorber illustrating the preferred embodiment of this invention.

Turning now in greater detail to the drawing, there is illustrated in FIG. 1 a rebound cut-off shock absorber 10 having a valved piston assembly 12 slidably mounted in an elongated cylinder tube 14 containing a predetermined quantity of hydraulic shock absorber fluid. A conventional base valve assembly 16 is secured within the lower end of the cylinder tube and is seated on a base cup 18 forming the lower end of the shock absorber. This base valve assembly controls the flow of hydraulic fluid to and from the compression chamber 19 formed in the cylinder tube below the piston assembly 12 and a fluid reservoir 20 formed by the annular space between the cylinder tube 14 and an outer cylindrical reservoir tube 22 secured at its lower end in a fluid-tight manner to the outer circumferential wall of the base cup 18.

Attached to the upper end of the cylinder tube 14 is a cylindrical cup-like rod guide 26 having a centralized axial opening 28 that slidably fits a cylindrical piston rod 30 projecting therethrough. This piston rod has its inner end welded or otherwise secured to the piston assembly 12 and extends upwardly therefrom through the rod guide opening 28 and through an annular, low pressure seal 31 to a terminal end portion exterior of the shock absorber.

This seal is retained in the shock absorber by an inverted cup-like cover 32 having a central opening 34 through which the piston rod 30 extends. The outer rim 36 of cover 32 is secured in a fluid tight manner to the upper end of the reservoir tube 22. The seal 31 is formed from a suitable elastomer material and has a single annular sealing lip 38 which is sealingly and slidably engaged with the outer circumferential surface of the piston rod 30 to hydraulically seal the upper end of the shock absorber to prevent the leakage of shock absorber fluid therefrom on reciprocation of the piston rod. The seal also has a scraper lip 39 outboard of the fluid sealing lip 38.

A garter spring 40 encircling the body of the seal and disposed concentric with the sealing lip 38 constricts the seal so that the lip 38 effects fluid sealing engagement with the piston rod. The seal is formed with a radial flange 44 which is trapped between a stepped portion of the inner surface 46 of cover 32 and a flat washer 48 held between the annular upper extremity 50 of the rod guide and the inner surface 46 of the cover 32. Concentric beads 53—53 formed on the flange 44 sealingly engage cover surface 46 to block escape of oil from the reservoir.

The rod guide is generally cylindrical in form and provides a recess in which an annular oil deflector 56 is employed. The oil deflector 56 preferably made of a molyfilled nylon has an upper cylindrical wall portion 58, engaging the corresponding inner wall of the rod guide, and a conical lower wall 60 which terminates in an annular oil pick-up surface 62 that preferably engages the piston rod with a close sliding fit.

Figure 3:
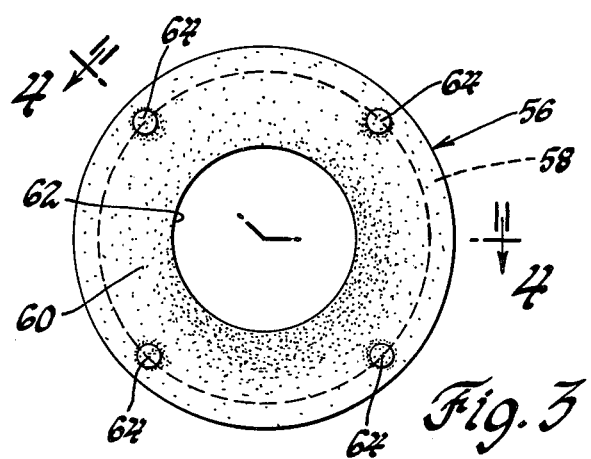
FIG. 3 is an end view of the oil deflector used in the preferred embodiment of this invention.
Figure 4:
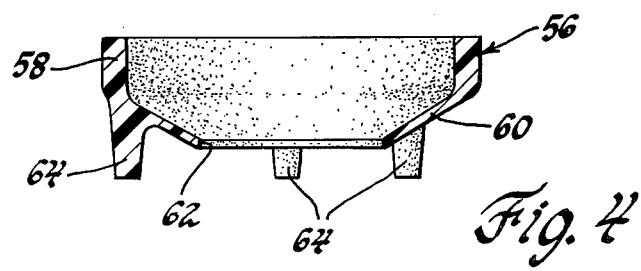
FIG. 4 is a sectional view taken along lines 4—4 of FIG. 3 showing a cross-sectional view of the oil deflector.

The oil deflector 56 has a plurality of arcuately spaced pedestals 64 shown in FIGS. 3 and 4 which rest on a floor 66 of the piston rod guide 26 for stabilized deflector support.

The shock absorber of this invention is preferably a rebound cut-off type in which shock absorber fluid is fed through a passage 68 within the piston rod and the valving in the piston assembly during the compression and rebound strokes.

Figure 2:
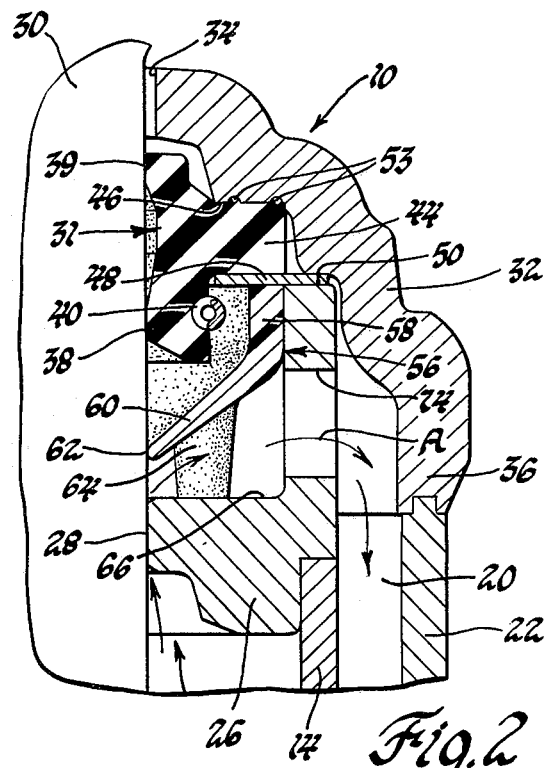
FIG. 2 is an enlargement of a portion of the shock absorber of FIG. 1.

In rebound, when the entrance 70 of the cut-off passage is blocked by the annular internal wall forming rod guide opening 28 of the piston rod guide, the shock absorber fluid in the cylinder tube above the piston assembly is trapped to limit the upward travel of the piston rod 30 in the cylinder tube. With rapid build-up of pressure between the piston assembly and the rod guide, high pressure jets of shock absorber fluid will be squeezed between the rod guide and the piston rod. These jets streaming through the clearance between the piston rod guide opening will impinge on conical wall of the oil deflector as indicated by the flow arrows "A" in FIG. 2 and will be deflected by the conical wall of the deflector through radial openings 74 in the rod guide for return to the reservoir 20. As shown in FIG. 2 the openings 74 are disposed radially outwardly of and are in alignment with the conical wall to facilitate flow into the upper end of the reservoir. With this construction, it will be appreciated that there is a blockage of flow of high pressure oil upon the low pressure seal which remains in sealing engagement with the piston rod. Accordingly, leakage of shock absorber fluid is effectively minimized even under high pressure conditions such as might occur on rebound. On compression stroke, pressure builds up in compression chamber 19 and resists the downward motion of the piston assembly 12. This chamber decreases in volume as oil is forced through the base valve into the reservoir 20 while air above the rising reservoir level is squeezed in conventional manner.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A hydraulic shock absorber comprising a cylinder tube having a hydraulic shock absorber oil therein, a reservoir tube spaced from said cylinder tube to provide a reservoir for shock absorber oil, a valved piston slidably mounted in said cylinder tube, base valve means operatively supported at one end of said cylinder tube for controlling the flow of oil to and from said cylinder tube, piston rod guide means disposed at the other end of the cylinder tube having an outer wall with a radial opening communicating with said reservoir, a piston rod extending from said piston through said rod guide means, annular oil deflector means mounted within the confines of said rod guide means aligned with said radial opening and directly contacting said piston rod for deflecting oil pressurized on the rebound stroke of said piston moving outwardly in said cylinder tube through said radial opening into said reservoir and low pressure seal means spaced from and disposed outwardly of said deflector means to contact said piston rod to block the escape of fluid from said shock absorber.

2. A shock absorber comprising a cylinder tube having a hydraulic fluid therein, a piston slidably mounted in said cylinder tube, base valve means operatively supported at one end of said cylinder tube for controlling the flow of said fluid to and from said cylinder tube, piston rod guide means operatively disposed at the other end of said cylinder tube having a centralized piston rod opening therein, a piston rod having one end secured to said piston and extending slidably through said piston rod opening to a termination external of said shock absorber, said rod being reciprocally movable in said cylinder tube, a reservoir tube disposed around said cylinder tube and cooperating therewith to form a reservoir for said hydraulic fluid, a seal cover secured to said reservoir tube and disposed around said rod guide, annular resilient seal means operatively disposed between said piston rod guide means and said seal cover, said seal means having an annular fluid sealing lip engaging said piston rod to provide a hydraulic seal for said shock absorber, hydraulic fluid deflector means defining a substantially conical fluid deflecting face disposed beneath said seal means and having an inner annular hydraulic fluid pick-up surface actively engaged with said piston rod for diverting said hydraulic fluid from said cylinder tube above said piston away from said seal means and directing said fluid into said reservoir to thereby prevent said fluid from flexing said seal means and escaping from said shock absorber on the movement of said piston rod outwardly of said cylinder tube.

3. A shock absorber comprising a cylinder tube having a hydraulic fluid therein, a piston slidably mounted in said cylinder tube, base valve means operatively supported at one end of said cylinder tube for controlling the flow of said fluid to and from said cylinder tube, a piston rod guide operatively disposed at the other end of said cylinder tube having a centralized piston rod opening therein, a cylindrical piston rod having one end secured to said piston and extending axially through said piston rod opening to a termination external of said shock absorber, said rod being movable inwardly and outwardly of said cylinder tube, a reservoir tube disposed around said cylinder tube and cooperating therewith to form a reservoir for said hydraulic fluid, a seal cover secured to said reservoir tube and disposed around said rod guide, annular resilient seal means operatively disposed between said piston rod guide and said seal cover, said seal means having an annular fluid sealing lip engaging said piston rod to provide a hydraulic seal for said shock absorber, an inclined hydraulic fluid deflector means having an annular contact surface disposed in close proximity to the outer surface of said piston rod located in said piston rod guide inboard of said seal means actively engaged with said piston rod for diverting hydraulic fluid from said seal means and directing said fluid into said reservoir to thereby prevent said fluid from flexing said seal means and escaping from said shock absorber on the movement of said piston rod outwardly of said cylinder tube.

* * * * *